No. 857,844. PATENTED JUNE 25, 1907.
A. H. STEBBINS.
COFFEE POT.
APPLICATION FILED MAY 11, 1906.
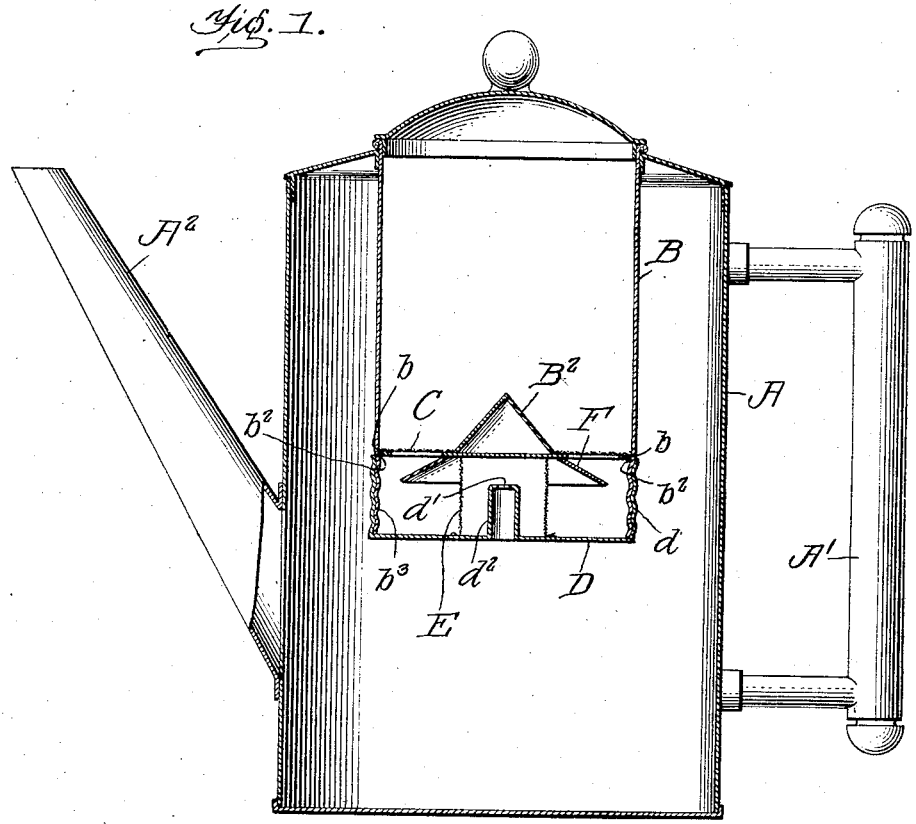
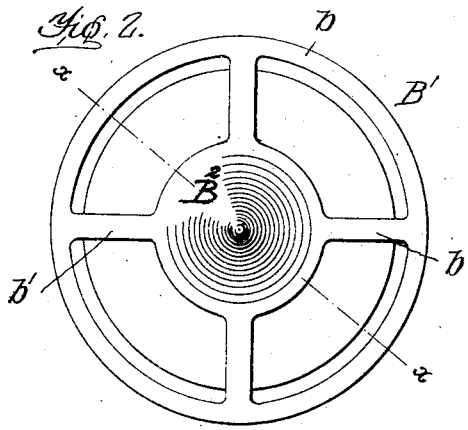
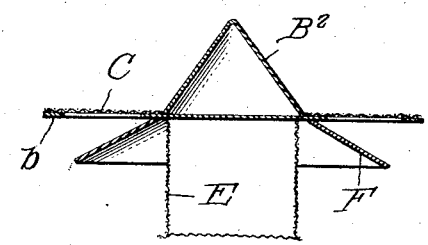
Witnesses
Jos. F. Collins.
A. R. Hunter.
Inventor
Albert H. Stebbins
by Robt. G. Hains
Attorney

UNITED STATES PATENT OFFICE.

ALBERT H. STEBBINS, OF LITTLE ROCK, ARKANSAS.

COFFEE-POT.

No. 857,844.      Specification of Letters Patent.      Patented June 25, 1907.

Application filed May 11, 1906. Serial No. 316,241.

*To all whom it may concern:*

Be it known that I, ALBERT H. STEBBINS, a citizen of the United States, residing at Little Rock, in the county of Pulaski and State of Arkansas, have invented certain new and useful Improvements in Coffee-Pots, of which the following is a specification.

The invention to be hereinafter described relates to coffee pots and, more especially, to that type for making drip coffee. In such form of coffee pots any suitable screen or cloth device is used to restrain the grounds of the coffee while the leaching water passes therethrough, but the full strength of the coffee extract is not secured by reason of the little time allowed the liquid to act upon the coffee grounds and, moreover, the smaller particles of the coffee will find their way through such devices and form settlings.

With the above general considerations in view, the present invention has for its object to provide a coffee pot of the drip type, wherein the construction shall be such as to retain the leaching liquid about the coffee for a desired length of time in order to extract the full strength thereof, and wherein also no settlings or finely-divided coffee grounds may find their way into the main body of the coffee pot.

The invention consists of the parts and combinations to be hereinafter more fully described and definitely pointed out in the claims.

In the drawing Figure 1 is a sectional elevation of one form of coffee pot embodying the present invention. Fig. 2 is a plan view of the screen support and cone, and Fig. 3 is a cross section on the line $x$—$x$, Fig. 2, with the screen in position.

In the drawings, A represents a coffee pot of any ordinary character or shape provided with the usual handle A' and spout $A^2$. Projecting downward from the top of the coffee pot A is the drip reservoir B. Near the lower portion of the drip reservoir is arranged a screen support B' consisting preferably of a rim portion $b$ and a central cone $B^2$, radial arms $b'$ preferably connecting and embracing the rim $b$ from the central conical portion. Between the radial arms $b'$ and extending from the rim to the central conical portion, the screen support has passageways for the passage of the leaching liquid, as will presently appear. The rim $b$ of the screen support preferably rests detachably upon a circumferentially contracted portion $b^2$ near the lower portion of the drip reservoir, as best seen in Fig. 1.

Adapted to rest upon the rim $b$ and near the base of the central conical portion of the screen support is the screen C, which may be of any appropriate character, and on this screen rests the ground coffee, the screen acting as a filter in a manner well understood.

The drip reservoir has a downward extension $b^3$, which is preferably bent into screw-thread contour, to which may be attached a cup D, said cup having corresponding thread portions $d$. The cup D is provided preferably at its central portion with a regulating outflow or hole $d'$, the same being disposed some distance above the bottom of the cup, see Fig. 1. To provide this raised part for the outflow or hole the wall at the bottom of the cup may be provided with upwardly projecting portions $d^2$.

From the construction thus far described, it will be seen that coffee grounds placed upon the screen C will be deflected by the cone $B^2$ circumferentially of the drip reservoir and that the leaching liquid will pass through the screen as a filter and drip into the cup D which, by reason of the elevated condition of the regulating outflow or hole $d'$, will hold the liquid back somewhat so that it shall not pass with too great readiness from the drip reservoir into and out of the cup. In other words, the raised outflow or hole $d'$ will act as a retarding means so that the leaching liquid will have more time to act upon the coffee grounds contained in the drip reservoir, it being understood, of course, that the amount of water placed in the drip reservoir is more than sufficient to fill the small cup D.

In order to prevent any finely divided coffee grounds from passing through the elevated outflow or hole $d'$, a vertical screen E is preferably secured to the under portion of the screen support, as indicated in Figs. 1 and 2, said screen E being extended downward about the outflow hole $d'$ and contacting with the bottom of the cup. Thus, as the leaching liquid reaches the cup D, any grounds that will have passed through the screen C will have time to settle in the cup D before the leaching liquid passes through the outflow or hole $d'$, and, by reason of the screen E, such particles as have a tendency to pass to the outflow or hole $d'$, will be retarded so that the liquid ultimately finding its way into the main body of the coffee pot will be clear and devoid of settlings. In order to further enhance this action, the under portion of the screen support is preferably provided with wings F extended downward below the screen support, as indicated in Figs. 1 and 3, said wings acting upon the liquid passing through the screen C to force it radially outward toward the circumferential portion of the cup D.

In using the device, coffee is placed in the drip reservoir above the screen C, and an appropriate amount of water is then poured into the drip reservoir, the cone $B^2$ acting to throw such water and coffee radially outward upon the screen. As the liquid passes through the screen C it contacts with the wings F and is thrown outward toward the circumference of the cup, ultimately finding its way into said cup, where it will bank up until it overflows the opening or hole $d'$. This hole, being of less capacity than the filtering effect of the screen C, will retard the passage of liquid therethrough so that said liquid in the drip reservoir will pass slowly through the screen C and be given time to thoroughly leach the ingredients. By reason of the elevated condition of the opening or hole $d'$ and by the action of the wings and vertical screen E any particles of coffee which find their way through the screen C will be caught in the cup D, and not permitted to enter the body of the coffee pot.

Having thus described my invention, what I claim and desire to secure by Letters Patent of the United States is:

1. In a coffee pot, the combination of a body, a drip reservoir fitted therein, a screen support comprising a rim section and a cone section and ribs or arms connecting said sections, said screen support as a whole being removable, a screen on said screen support and through which the leaching liquid passes, and a cup disposed below the screen and having a raised outlet for the leaching liquid.

2. In a coffee pot, the combination of a body, a drip reservoir fitted therein, a screen support comprising a cone section, a rim section, ribs or arms connecting said sections, wings attached to and extending below said support, a screen lying upon said support and surrounding the base of said cone section and a cup disposed below the screen and having a raised outlet for the leaching liquid.

3. In a coffee pot, the combination of a body, a drip reservoir fitted therein, a removable screen support having a cone centrally thereof and projecting into the drip reservoir, a removable screen resting on said support and surrounding the base of said cone, wings projecting from the screen support below said screen, and a cup disposed below the screen and having a raised outlet for the leaching liquid.

4. In a coffee pot, the combination of a body, a drip reservoir fitted therein, a screen support fitted in said reservoir, said screen support comprising a rim section, a cone section, ribs or arms connecting said rim and the base of said cone section, wing sections depending from said screen support, a vertical screen secured to the bottom of said cone section, a screen lying upon said support and surrounding the base of said cone section and a cup removably secured to the base of said reservoir, said cup having a raised overflow opening for the leaching liquid.

5. In a coffee pot, the combination of a body, a drip reservoir fitted therein, a bead on the interior of said reservoir, a removable screen support resting on said bead, said screen support comprising a rim section, a cone section, ribs or arms connecting said rim and the base of said cone sections, wings depending from said support, a vertical tubular screen depending from the bottom of said cone section and lying within said wings and a cup secured below said screen and provided with a raised outlet for the leaching liquid.

6. In a coffee pot, the combination of a body, a drip reservoir fitted therein, a bead on the interior of said reservoir, a removable screen support resting on said bead, said screen support comprising a rim section, a cone section, ribs or arms connecting said rim and the base of said cone sections, wings depending from said support, a vertical tubular screen depending from the bottom of said cone section and lying within said wings and a cup secured below said screen and provided with a raised outlet for the leaching liquid, said raised outlet lying within said depending screen and the bottom of said cup contacting with the lower edge of said screen.

In testimony whereof I affix my signature in presence of two witnesses.

ALBERT H. STEBBINS.

Witnesses:
  W. F. BLACKWOOD,
  J. E. LEAS.